United States Patent [19]
Evjen et al.

[11] 3,741,428
[45] June 26, 1973

[54] VIBRATION RESISTANT CASE AND MOUNTING BRACKET

[75] Inventors: John Martin Evjen; Leonard Ronald Dinkler, both of Gainesville, Fla.

[73] Assignee: General Electric Company, Owensboro, Ky.

[22] Filed: Aug. 12, 1970

[21] Appl. No.: 63,182

[52] U.S. Cl.................... 220/18, 248/27, 248/300
[51] Int. Cl............................................. B65d 25/24
[58] Field of Search........................ 220/18, 3.4, 85, 220/3.6, 3.3, 3.9; 211/87; 248/27; 312/242, 245; 206/2

[56] References Cited
UNITED STATES PATENTS

| | | | |
|---|---|---|---|
| 1,246,741 | 11/1917 | Hancock et al...................... | 220/3.4 |
| 2,232,656 | 2/1941 | Davis........................... | 220/DIG. 29 |
| 2,231,027 | 2/1941 | Renner, Jr................... | 220/DIG. 29 |
| 2,718,485 | 9/1955 | Samuely...................... | 206/DIG. 18 |
| 3,428,284 | 2/1969 | Trachtenberg...................... | 220/3.9 |
| 3,489,266 | 1/1970 | Miller.................... | 206/2 |
| 2,843,071 | 7/1958 | Kitzinger..................... | 220/DIG. 22 |

Primary Examiner—Raphael H. Schwartz
Attorney—Nathan J. Cornfeld, John P. Taylor, Nathan M. Briskin, Frank L. Neuhauser, Oscar B. Waddell and Joseph B. Forman

[57] ABSTRACT

A structure is provided comprising a thin-wall metal rectangular parallelopiped case having at least one mounting bracket welded to the case. The mounting bracket is designed to be bonded to at least two surfaces of the case so that vibrational forces having vectors along all three axes will be resisted by adhesion means in shear in the planes of the thin walls to provide lower stresses for equivalent vibrating forces.

1 Claim, 2 Drawing Figures

PATENTED JUN 26 1973 3,741,428

INVENTOR.
JOHN M. EVJEN
LEONARD R. DINKLER
BY John P. Taylor
THEIR ATTORNEY

VIBRATION RESISTANT CASE AND MOUNTING BRACKET

BACKGROUND OF THE INVENTION

This invention relates to a rectangular parallelopiped thin-walled metal case having a vibration resistant mounting bracket. More particularly this invention relates to a light weight metal battery case having at least one metal mounting bracket bonded thereto to resist vibrational forces along the X, Y, and Z axes.

Materials and components useful in aviation and space applications require a combination of minimum weight yet high strength to withstand stresses which in some cases may be much greater than normally encountered in ground applications. A particular requirement for components to be used in aircraft is the ability to withstand vibration along the X, Y, and Z axes. For example, a battery case for a particular aircraft must be constructed with sufficient strength to withstand vibration in the frequency range of 5–1000Hz at excitation forces up to 6G in any direction. While it is desirable to construct such a casing of very light weight material, the need for sufficient resistance to vibration and, at the same time, the economic requirements for a low cost material necessitates the need for special structural designs.

Such rigorous requirements demanded of components, particularly, for example, a battery casing, are not without justification. When unusual stress and strain are encountered in the operation of the aircraft it is highly undesirable to have components of the aircraft particularly heavy components, breaking loose and moving about within the aircraft. In the case of a battery, additional factors demand its secure installation. The battery, being a source of electrochemical energy, could, if it broke loose, cause severe damage to compartments, other essential controls and equipment, the fuselage skin and the aircraft structural members, a highly undesirable result. In addition, the battery in an aircraft very often represents the sole source of emergency energy needed to power the instruments of the aircraft. Thus, if the battery were to break loose under a high stress condition which also rendered the main power ineffective, the very source of backup power needed for such an emergency would also be lost. It is therefore very important from a standpoint of safety to provide a light weight battery casing and mounting bracket capable of withstanding severe vibrational forces and having a stiffer, more rigid, less elastic connection between the source of the vibration, i.e., the mounting rails in the aircraft, and the vibrated mass, i.e., the cells of the battery within the case to increase any resonant frequencies involved and to reduce the displacement amplitude for given excitation forces.

SUMMARY OF THE INVENTION

It is therefore an object of the invention to provide a rectangular parallelopiped casing having bracket means mounted thereon to provide for the transfer of the vibrational excitation forces from the bracket mounting surfaces, to the mass within the casing through the plane of the thin-case walls, thereby providing a rigid, high strength, low stressed, connective construction between the bracket and the casing along the X, Y, and Z axes. Other objects of the invention will become apparent from a reading of the description and the accompanying drawings.

DESCRIPTION OF THE PREFERRED EMBODIMENT

Figure 1:
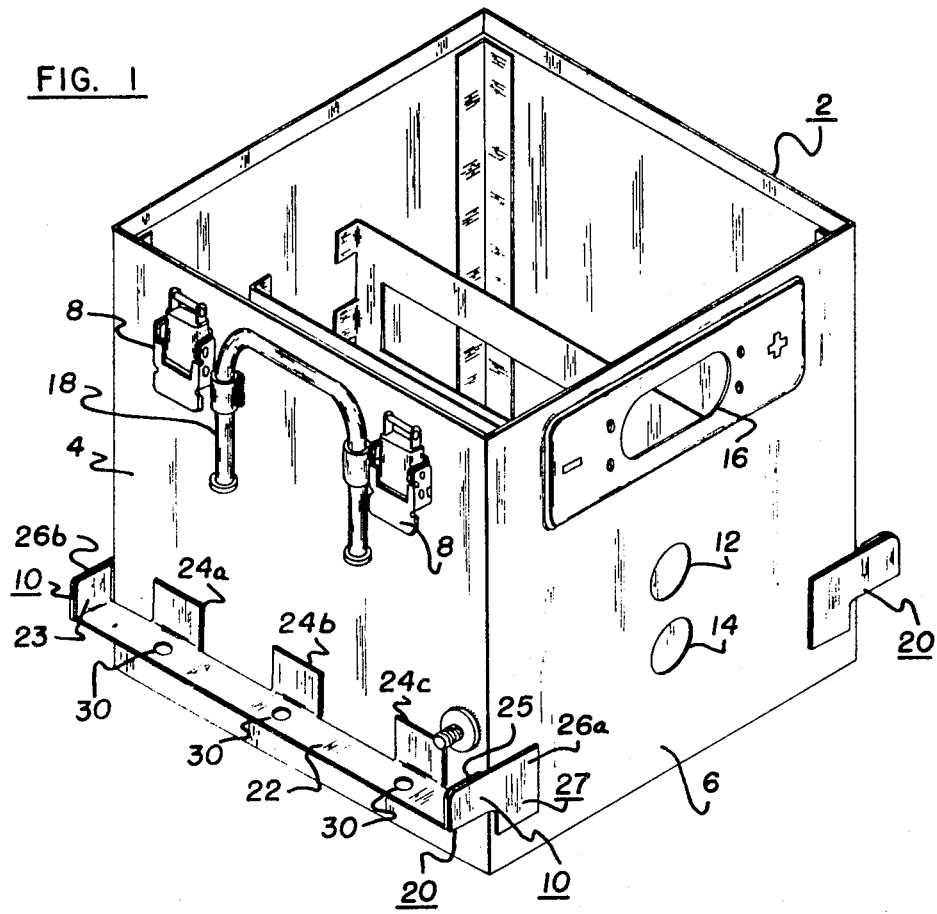
FIG. 1 is an isometric view of the invention.

Referring now to the drawings, and particularly to FIG. 1, a rectangular parallelopiped or cuboid metal casing which, in the illustrated embodiment, serves as a housing for a plurality of rechargeable cells (not shown) is generally illustrated at 2. Casing 2 comprises a metal box having rectangular sides, a detachable cover (not shown) vent and accessory openings 12 and 14, a terminal access opening 16, and a mounting bracket 20 which will be described in more detail below. Casing 2 may also, if desired, be fitted with bails 18 to assist in transportation of the casing when, for example, it is not affixed to the aircraft. In the illustrated embodiment, the detachable cover is removably attached to casing 2 by luggage type fasteners 8.

Casing 2 preferably comprises thin wall stainless steel of approximately 20–40 mil thickness. The particular type of stainless steel is chosen to be one which will be economical yet provide adhesion characteristics compatible with the particular adhesion means used as well as chemical resistance for the electrolyte used in the cells of the battery. In the illustrated embodiment, for example, nickel-cadmium rechargeable batteries are used with a potassium hydroxide electrolyte. The use of nickel-cadmium rechargeable cells is preferred in aviation and space applications because of the low weight per unit of charge-energy relationship of these materials as well as their performance at low temperature.

Figure 2:
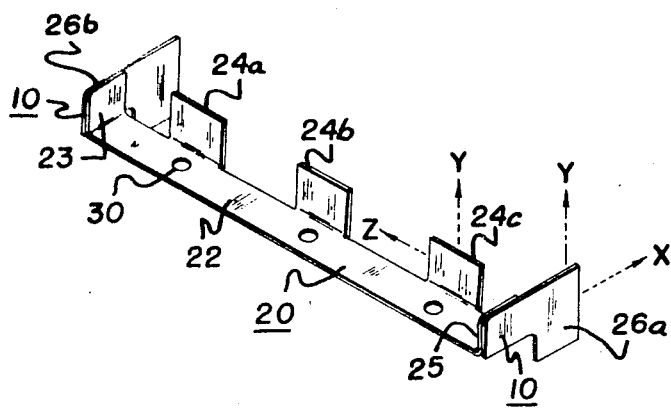
FIG. 2 is an isometric view of a portion of FIG. 1.

Brackets 20, as seen in both FIGS. 1 and 2, comprise a longitudinally extending portion 22 having a plurality of tabs 24a, 24b, and 24c extending at right angles therefrom. As best seen in FIG. 1 in the preferred embodiment, tabs 24a, 24b, and 24c are welded directly to a side 4 of casing 2. At each end of longitudinally extending portion 22 respectively brace members 26a and 26b are affixed to the ends of portion 22 in a plane which is perpendicular to both the plane in which portion 22 lies and the plane defined by tabs 24 and wall 4. Braces 26a and 26b may be formed integral with portion 22 or as in the illustrated embodiment, they may be welded at 10 to upturned ends 23 and 25 of portion 22 which have been bent at right angles to the portion 22. Braces 26a and 26b are welded to the sides of casing 2 adjoining side 4. Thus, for example as shown in FIG. 1, bracket 26a is welded to side 6 of casing 2 at 27. As partially shown in the illustrated embodiment, a second bracket 20 may be similarily mounted to the side wall of casing 2 opposite wall 4 and to side 6 and the side opposite side 6.

In the preferred embodiment, bracket 20 is secured to casing 2 by adhesion means such as welding rather than by other securement means because adhesion or bonding by chemical adhesives or welding results in a strong and permanent yet inexpensive attachment consuming less space and providing better resistance to vibrational stresses than, for example, bolts or other threaded attachment means. In accordance with the invention, the use of welds to attach a bracket such as the one described results in a stronger bond of the bracket to the casing particularly in shear as will be explained in more detail below. It should also be noted here that the use of a bolt or similar attachment would result in some freedom of unsprung motion in the plane of the connected or facing surfaces, restrained only by the surface frictional forces between these surfaces because of the necessity of providing openings in the bracket and the casing slightly larger than the diameter of the bolt. The use of the term chemical adhesives is intended to include resins and glues such as, for example, an epoxy resin or a cyanoacrylate such as Eastman 910 which form adhesive bonds having good resistance to vibrational stresses in shear. The use of the terms adhesion means and bonding are intended to include both chemical adhesives and metallurgical bonding such as welding, brazing, or other alloying.

Bracket 20 is provided with holes 30 which allow the complete assembly to be removably fastened, by bolts or the like, to suitable mounting means in the aircraft. It should be noted here that the use of bolts, in contrast to the welds used to secure bracket 20 to casing 2, is preferred for purposes of detachment of the battery casing from the aircraft. A strong and relatively vibration free attachment can be made here by the use of bolts or the like because the bracket, being small with respect to the casing, can be made thicker—and thus mechanically stronger, without unduly adding to the weight of the assembly.

The attachment of bracket 20 to casing 2 by the respective welding of tabs 24 to side 4 and brace 26a to side 6 (as well as the securement of brace 26b to the side opposite side 6) results in a series of welds which are resistant in shear to vibrational force vectors along all three axes. Thus, despite the fact that casing 2 is constructed of lightweight, thin-wall material, the mounting of bracket 20 to casing 2 in accordance with the invention provides a construction which has enhanced resistance to forces having vectors along any of the three axes which might, but for the additional weld providing shear resistance along that axis, put the thin wall in a flexible, highly stressed bending mode, perpendicular to the plane of the wall rather than in the rigid, low stressed mode in the plane of the wall, or indeed even fracture the casing when the adhesion capability of the weld is stronger than the strength of the thin wall of the case itself.

Thus, for example, referring to the designated axes in FIG. 2, a force directed along the X-axis is resisted primarily in shear by the weld between brace 26a and side 6. If the only welds holding bracket 20 to casing 2 were made via tabs 24 to side 4, such a force in the X-axis would only be resisted by the cohesive nature of the bond of each of the tabs 24 to side wall 4 and the diaphragm bending of side wall 4. Since this weld bond is not as rigid or as strong as a weld and thin wall in shear, tabs 24 might well pull away from side 4 or even cause a rupture or tearing of side 4 itself and would certainly cause a lowering of the resonant frequencies of the assembly. Likewise, forces in the Y-axis are opposed in shear by both the welds of tabs 24 to side wall 4 and the welds of braces 26a and 26b to their respective side walls while a force in the Z-axis is opposite in shear by the welds between tabs 24 and side wall 4. A force having vector components in more than one axis, as would more commonly be the case, will of course be opposed in shear by the weld or welds opposing the respective vector component of the force along that respective axis.

Thus, the novel configuration and mounting of bracket 20 to casing 2 provides a vibration resistant securement of bracket 20 to casing 2 wherein vibration along any of the three axes are resisted by welds and thin walls in shear. Relatively thin wall, lightweight, and inexpensive materials may therefore be used as casing materials in the practice of this invention without sacrificing structural strength and vibration resistance necessary for the safe utilization of the product.

What I claim as new and desire to secure by Letters Patent of the United States is:

1. A thin-wall rectangular parallelopiped battery casing constructed with sufficient strength to withstand vibration in the frequency range of 5–1,000 Hz at excitation forces up to 6G in any direction comprising thin-wall metal of approximately 20–40 mil thickness; a pair of spaced apart brackets attached to sidewalls of said case, each of said brackets comprising end portions welded respectively to opposite sidewalls of said casing; a longitudinally extending portion therebetween located in a plane normal to the planes of said end portions and joined at each end to one of said end portions; and tabs portions on said longitudinally extending portion welded to a sidewall of said casing adjoining said opposite sidewalls, said tabs being located in a plane normal to the plane of said longitudinally extending portion and the planes of said end portion whereby each of said brackets is attached by welding to two normal planes of said casing to resist vibrational forces in shear in all three axes by the adhesive co-action of said end portions and said tabs of each of said brackets with the walls of said casing in planes normal to one another.

* * * * *